United States Patent
Matsuda

(10) Patent No.: US 10,067,294 B2
(45) Date of Patent: Sep. 4, 2018

(54) BEAM DISTRIBUTOR

(71) Applicant: FANUC CORPORATION, Yamanashi (JP)

(72) Inventor: Munekazu Matsuda, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/786,221

(22) Filed: Oct. 17, 2017

(65) Prior Publication Data
US 2018/0106971 A1 Apr. 19, 2018

(30) Foreign Application Priority Data

Oct. 19, 2016 (JP) .................. 2016-205259

(51) Int. Cl.
| | |
|---|---|
| *G02B 6/32* | (2006.01) |
| *G02B 6/35* | (2006.01) |
| *G02B 6/36* | (2006.01) |
| *G02B 6/42* | (2006.01) |
| G02B 6/12 | (2006.01) |

(52) U.S. Cl.
CPC .......... *G02B 6/3598* (2013.01); *G02B 6/352* (2013.01); *G02B 6/359* (2013.01); *G02B 6/3582* (2013.01); *G02B 6/3604* (2013.01); *G02B 6/4204* (2013.01); *G02B 2006/12121* (2013.01)

(58) Field of Classification Search
CPC ................................... G02B 6/3598
See application file for complete search history.

(56) References Cited

U.S. PATENT DOCUMENTS 5,420,946 A * 5/1995 Tsai ............... G02B 6/352
385/16
5,920,667 A * 7/1999 Tiao ............... G02B 6/32
385/22

(Continued)

FOREIGN PATENT DOCUMENTS

JP S54-089695 U 6/1979
JP H02-041218 U 3/1990

(Continued)

OTHER PUBLICATIONS

An Office Action issued by the Japanese Patent Office dated Feb. 13, 2018, which corresponds to Japanese Patent Application No. 2016-205259 and is related to U.S. Appl. No. 15/786,221.

*Primary Examiner* — Sung Pak
(74) *Attorney, Agent, or Firm* — Studebaker & Brackett PC

(57) ABSTRACT

The beam distributor includes a housing, at least one beam entrance, two or more beam exits, a motor, and a beam turning part fixed to a rotary axis member of the motor and changing a direction of a beam input to the inside of the housing through the beam entrance so as to guide the input beam to the beam exit. A rotary axis of the motor is arranged parallel to an optical axis of the beam so as to input the beam to the beam turning part at a constant angle independently of a rotational angle about the rotary axis of the motor. The beam exit is arranged in a direction to which the direction of the beam is changed by the beam turning part in response to rotation of the rotary axis member. A storage stores an angular information recorded in advance about the rotary axis.

3 Claims, 3 Drawing Sheets

(56) References Cited

U.S. PATENT DOCUMENTS

| | | | | |
|---|---|---|---|---|
| 6,952,010 B2* | 10/2005 | Nizani | ............... | G02B 6/29361 |
| | | | | 250/216 |
| 7,151,869 B2* | 12/2006 | Fernando | ............. | G01N 21/255 |
| | | | | 385/16 |
| 9,946,030 B1* | 4/2018 | Takigawa | ............. | B23K 26/067 |
| 2002/0076134 A1* | 6/2002 | Singh | ................... | G02B 6/3572 |
| | | | | 385/16 |
| 2003/0053744 A1* | 3/2003 | Makio | ................ | G02B 6/2552 |
| | | | | 385/18 |
| 2003/0081886 A1* | 5/2003 | Wu | ........................ | G02B 6/352 |
| | | | | 385/18 |
| 2012/0115316 A1 | 5/2012 | Park | | |

FOREIGN PATENT DOCUMENTS

| | | |
|---|---|---|
| JP | H06-344170 A | 12/1994 |
| JP | H11-113925 A | 4/1999 |
| JP | H11-312831 A | 11/1999 |
| JP | 2000-066127 A | 3/2000 |
| JP | 2000-330042 A | 11/2000 |
| JP | 2002-006122 A | 1/2002 |
| JP | 2010-040784 A | 2/2010 |
| JP | 2015-182104 A | 10/2015 |

* cited by examiner

BEAM DISTRIBUTOR

BACKGROUND OF THE INVENTION

This application is based on and claims the benefit of priority from Japanese Patent Application No. 2016-205259, filed on 19 Oct. 2016, the content of which is incorporated herein by reference.

FIELD OF THE INVENTION

The present invention relates to a beam distributor.

RELATED ART

According to a beam distributor conventionally known, multiple optical fibers are switched to select one optical fiber and one laser beam is caused to propagate through the selected optical fiber (see patent document 1). The beam distributor described in patent document 1 is configured in such a manner that a reflector is rotated by a rotary drive motor to a predetermined reflection position and a laser beam is reflected on a reflection surface of the reflector, thereby switching the laser beam in direction input through a beam entrance so as to make the laser beam propagate through one of multiple optical fibers.

Patent Document 1: Japanese Unexamined Patent Application, Publication No. H11-113925

SUMMARY OF THE INVENTION

In the beam distributor described in patent document 1, rotating the reflector changes a tilt angle of the reflection surface from an optical axis of a laser beam to be input. This results in difference between angles at which laser beams are to be input to the reflection surface of the reflector. If laser beams are input to the reflection surface of the reflector at different angles, the reflectivity of each of the laser beams may be reduced in a manner that depends on a rotational angle about the reflector. This causes large energy loss of the laser beams. Thus, a beam distributor capable of suppressing reflectivity reduction has been desired.

The present invention is intended to provide a beam distributor capable of suppressing reflectivity reduction.

(1) The present invention relates to a beam distributor (beam distributor 1 described later, for example) including: a housing (case body 10 described later, for example) for passage of a beam; at least one beam entrance (beam entrance 3 described later, for example); two or more beam exits (beam exits 4 described later, for example); a motor (rotary drive motor 6 described later, for example); a position detection device (position detector 7 described later, for example) that detects a rotational position about a rotary axis member (rotary axis member 62 described later, for example) of the motor; a controller (controller 8 described later, for example) that controls the rotational position about the rotary axis member of the motor; a storage (storage 9 described later, for example) that stores the rotational position about the rotary axis member of the motor; and a beam turning part (tilted reflector 21 described later, for example) fixed to the rotary axis member of the motor and changing a direction of a beam input to an inside of the housing through the beam entrance so as to guide the beam being input to one of the beam exits. A rotary axis (rotary axis J described later, for example) of the motor is arranged parallel to an optical axis of the beam input through the beam entrance so as to input the beam to the beam turning part at a constant angle independently of a rotational angle about the rotary axis of the motor. Each of the beam exits is arranged in a direction to which the direction of the beam is changed by the beam turning part in response to rotation of the rotary axis member of the motor. The storage stores an angular information recorded in advance about the rotary axis of the motor corresponding to the position of each of the multiple beam exits.

(2) The beam distributor described in (1), preferably includes a scattered light sensor (photodiode 5 described later, for example) that detects scattered light of a reflected beam at one of the beam exits changed in direction by the beam turning part. The angular information in the storage is preferably changed so as to minimize a value detected by the scattered light sensor while the reflected beam is output to one of the beam exits.

(3) In the beam distributor described in (1) or (2), a temperature switch (temperature switch 23 described later, for example) is preferably installed on an extension of an optical axis of an input beam input to the housing through the beam entrance and behind the beam turning part, and the temperature switch is preferably configured in such a manner that it is determined whether or not the beam turning part has been burned by turning on or off of the temperature switch.

(4) The beam distributor described in any one of (1) to (3), preferably includes a guide laser (guide laser light source 22 described later, for example) that oscillates a visible ray (visible ray 22a described later, for example). The beam turning part preferably has dichroism by which the beam turning part reflects an input beam input to the housing through the beam entrance and causes the visible ray to pass through. The guide laser is preferably arranged in such a manner that the visible ray oscillated by the guide laser passes through the beam turning part to travel in conformity with an optical axis of a reflected beam.

According to the present invention, a beam distributor capable of suppressing reflectivity reduction can be provided.

DETAILED DESCRIPTION OF THE INVENTION

Figure 1:
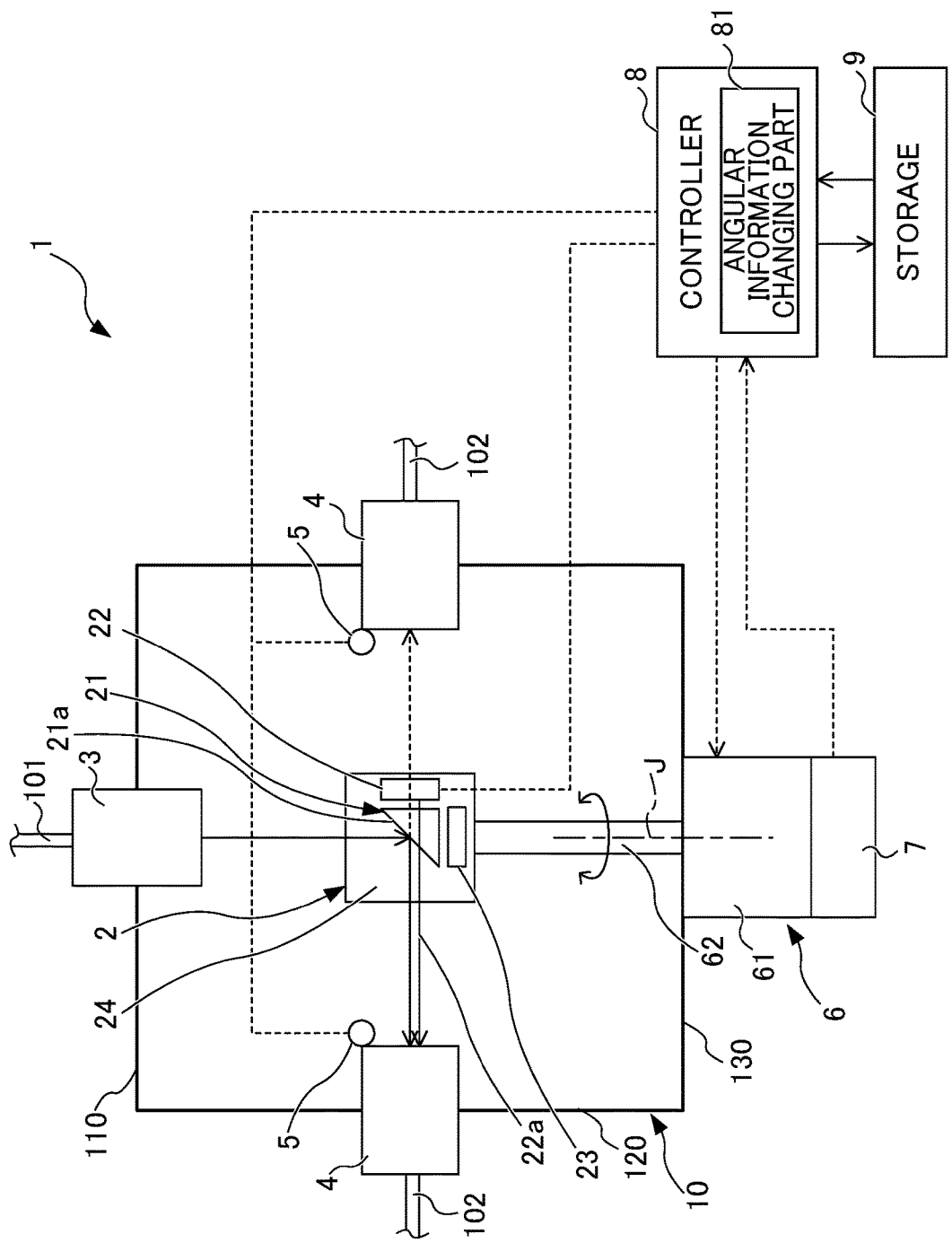
FIG. 1 shows the configuration of a beam distributor according to an embodiment.

An embodiment of the present invention will be described below by referring to the drawings.

Figure 2:
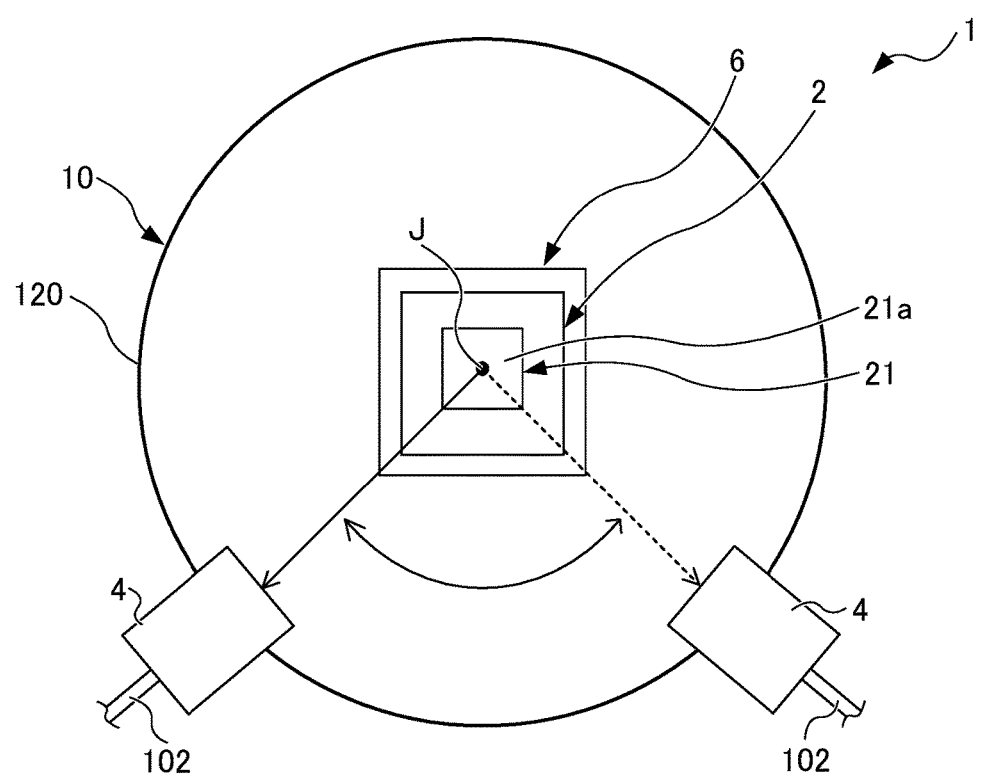
FIG. 2 shows a tilted reflector of the beam distributor according to the embodiment when viewed in the direction of a rotary axis.
Figure 3:
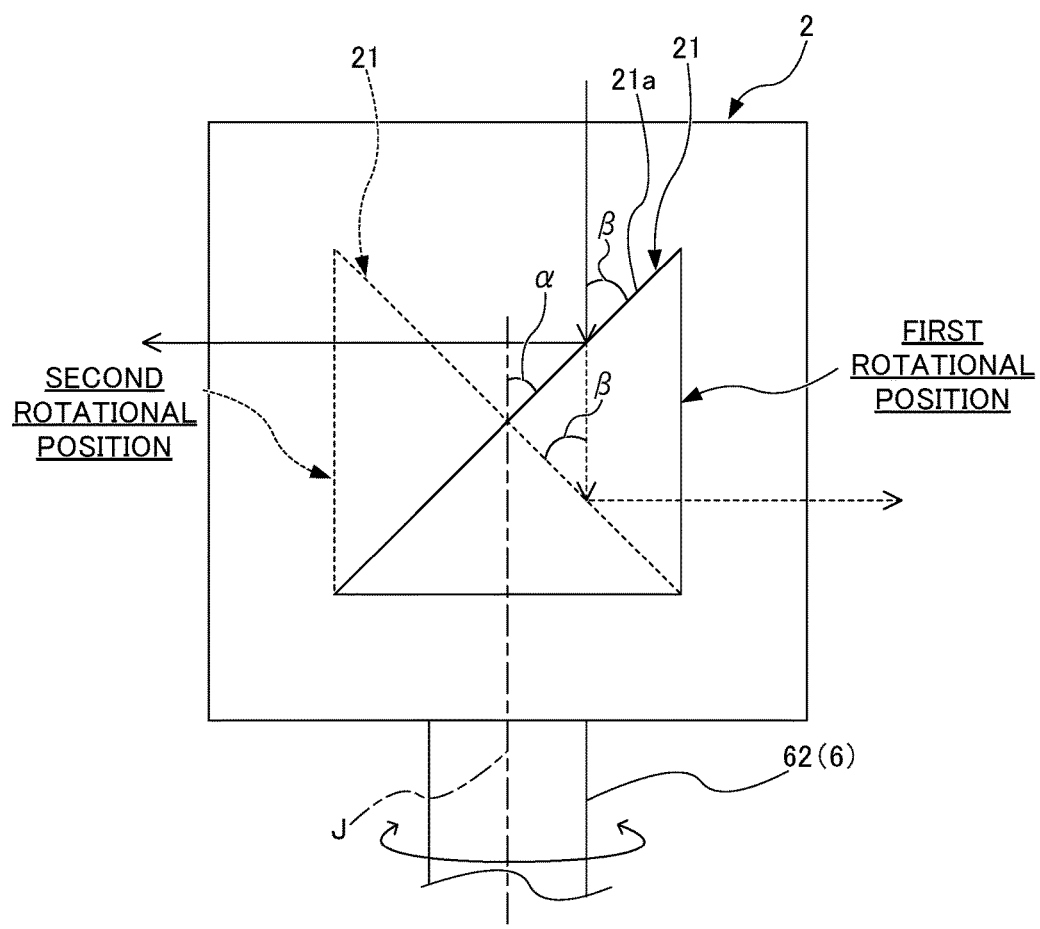
FIG. 3 shows an input angle about a laser beam input to the tilted reflector according to this embodiment determined by rotation of the tilted reflector.

FIG. 1 shows the configuration of a beam distributor 1 according to the embodiment. FIG. 2 shows a tilted reflector 21 of the beam distributor 1 according to the embodiment when viewed in the direction of a rotary axis J. FIG. 3 shows an input angle about a laser beam input to the tilted reflector 21 according to this embodiment determined by rotation of the tilted reflector 21.

The beam distributor 1 according to this embodiment is a device for selectively switching an input beam (laser beam, laser light) to any of multiple output-side optical fibers 102 after the beam is output from a laser device (not shown in the drawings) and then input through an input-side optical fiber 101. The laser beam selectively switched by the beam distributor 1 is caused to propagate through the output-side optical fiber 102 to be used for welding or cutting during laser machining.

As shown in FIG. 1, the beam distributor 1 includes a beam turning unit 2, one beam entrance 3, two beam exits 4, two photodiodes 5 (scattered light sensor), a rotary drive motor 6 (motor), a controller 8, a storage 9, and a case body 10 (housing).

As shown in FIGS. 1 and 2, the case body 10 is formed into a cylindrical shape. The case body 10 has a circular upper plate 110, a cylindrical circumferential plate 120, and a circular lower plate 130. A laser beam passes through the inside of the case body 10. The case body 10 houses at least the beam turning unit 2. The case body 10 has multiple attachment openings (not shown in the drawings) for attachment of corresponding members of the beam distributor 1 (one beam entrance 3, two beam exits 4, rotary driver motor 6).

The one beam entrance 3 is attached to the upper plate 110 of the case body 10. A laser beam output from a laser output device (not shown in the drawings) is input as an input beam to the beam entrance 3 through the input-side optical fiber 101.

The two beam exits 4 are attached to the circumferential plate 120 of the case body 10 to be spaced apart from each other circumferentially. The output-side optical fibers 102 are connected to corresponding ones of the two beam exits 4. A laser beam is output as an output beam from each of the two beam exits 4 selectively in a manner that depends on a direction where a reflection surface 21a of the tilted reflector 21 (described later) rotated by the rotary drive motor 6 is pointed. Each of the two beam exits 4 is arranged in a direction to which a laser beam is changed in direction by the tilted reflector 21 in response to rotation of a rotary axis member 62 of the rotary drive motor 6.

As shown in FIGS. 1 and 2, the rotary drive motor 6 is attached to the lower plate 130 of the case body 10. The rotary drive motor 6 includes a motor body 61 and the rotary axis member 62. The rotary drive motor 6 is formed of a servo motor and includes a built-in position detector 7 (position detection device). The position detector 7 detects a rotational position about the rotary axis member 62 of the rotary drive motor 6. The position detector 7 may be built in the rotary drive motor 6. Alternatively, the position detector 7 may not be built in the rotary drive motor 6 but may be connected to the rotary drive motor 6.

The rotary drive motor 6 is controlled by a controller 8 described later based on position information about a position detected by the position detector 7. The rotary drive motor 6 rotates the rotary axis member 62 about the rotary axis J to rotate the beam turning unit 2 including the tilted reflector 21 about the rotary axis J.

The rotary axis member 62 extends linearly upwardly from the motor body 61. A tip portion of the rotary axis member 62 is located at a substantially central position when viewed vertically in the case body 10. The rotary axis member 62 is rotatable about the rotary axis J. The rotary axis J of the rotary axis member 62 of the rotary drive motor 6 is arranged parallel to an optical axis of a laser beam input through the beam entrance 3 so as to input the laser beam to the tilted reflector 21 at a constant angle independently of a rotational angle about the rotary axis J of the rotary drive motor 6. As long as the rotary axis J of the rotary axis member 62 extends parallel to an optical axis of a laser beam input through the beam entrance 3, the rotary axis J may be coaxial with or may not be coaxial with the optical axis of the laser beam.

The beam turning unit 2 is fixed to the tip portion of the rotary axis member 62 of the rotary drive motor 6. The beam turning unit 2 includes the tilted reflector 21 (beam turning part), a guide laser light source 22 (guide laser), a temperature switch 23, and a support member 24. The tilted reflector 21, the guide laser light source 22, and the temperature switch 23 are supported by the support member 24. In response to rotation of the rotary axis member 62 of the rotary drive motor 6, the beam turning unit 2 including the tilted reflector 21 and the guide laser light source 22 rotates as one unit about the rotary axis J.

In this embodiment, the beam turning unit 2 including the tilted reflector 21 (described later) is fixed to the tip portion of the rotary axis member 62 of the rotary drive motor 6. Thus, a rotational angle about the rotary axis member 62 of the rotary drive motor 6 directly determines a direction in which a laser beam is to be reflected. Hence, to reflect a laser beam toward a selected one of the beam exits 4, a rotational angle should be controlled with a high degree of accuracy. In this embodiment, for highly accurate control over a rotational angle, the controller 8 described later exerts feedback control so as to adjust a rotational angle at a target angle by using the rotary drive motor 6 formed of the servo motor and the position detector 7.

The tilted reflector 21 reflects an input laser beam input to the inside of the case body 10 through the beam entrance 3 so as to guide the input laser beam to a selected one of the beam exits 4, thereby changing the laser beam in direction. The reflection surface 21a of the tilted reflector 21 is arranged to tilt at an angle at which an input beam traveling parallel to the rotary axis J of the rotary axis member 62 of the rotary drive motor 6 is to be reflected toward a corresponding one of the beam exits 4.

The reflection surface 21a of the tilted reflector 21 is tilted from the rotary axis J. Rotation of the rotary axis member 62 of the rotary drive motor 6 about the rotary axis J changes a circumferential direction in which the reflection surface 21a is pointed. As shown in FIG. 3, in this embodiment, the tilted reflector 21 is tilted at a tilt angle $\alpha$ from the rotary axis J. In this embodiment, the tilt angle $\alpha$ is set at 45 degrees for the tilted reflector 21, for example. However, the tilt angle $\alpha$ is not limited to 45 degrees but the tilt angle $\alpha$ can be set appropriately in a manner that depends on a position where the beam exit 4 is arranged or a direction where the beam exit 4 is pointed, for example.

In this embodiment, while the rotary axis member 62 of the rotary drive motor 6 rotates, an input angle $\beta$ about an input beam input to the tilted reflector 21 is constant independently of a rotational angle about the rotary axis member 62. This will be explained by making comparison by referring to FIG. 3 between a case where the tilted reflector 21 is located at a first rotational position (the tilted reflector 21 indicated by solid lines in FIG. 3) and a case where the tilted reflector 21 is located at a second rotational position (the tilted reflector 21 indicated by dashed lines in FIG. 3), for example. The first rotational position and the second rotational position are shifted 180 degrees from each other in terms of a rotational angle about the rotary axis member 62 of the rotary drive motor 6.

As shown in FIG. 3, if the tilted reflector 21 is located at the first rotational position (the tilted reflector 21 indicated by solid lines in FIG. 3), an input beam is input to the reflection surface 21a of the tilted reflector 21 at the input angle $\beta$. Like in the case where the tilted reflector 21 is located at the first rotational position, if the tilted reflector 21 is located at the second rotational position (the tilted reflector 21 indicated by dashed lines in FIG. 3), an input beam is input to the reflection surface 21a of the tilted reflector 21 at the input angle β.

As described above, the input angle β at which a beam is input to the reflection surface 21a of the tilted reflector 21 is common between the case where the tilted reflector 21 is at the first rotational position and the case where the tilted reflector 21 is at the second rotational position. The input angle β is not changed by a rotational position about the tilted reflector 21.

The tilted reflector 21 has dichroism by which the tilted reflector 21 reflects an input beam formed of an infrared ray and causes a visible ray 22a to pass through. In this embodiment, a laser beam formed of infrared light is emitted from ahead of the tilted reflector 21, whereas the visible ray 22a oscillated by the guide laser light source 22 is emitted from behind the tilted reflector 21.

As shown in FIG. 1, the guide laser light source 22 is arranged behind the tilted reflector 21 when viewed in a direction in which a beam to be output travels through the tilted reflector 21. The guide laser light source 22 is arranged in such a manner that the visible ray 22a oscillated by the guide laser light source 22 passes through the tilted reflector 21 to travel in conformity with the optical axis of a reflected beam. The guide laser light source 22 inputs the visible ray 22a to the titled reflector 21 from behind the tilted reflector 21. By doing so, the visible ray 22a emitted from behind the tilted reflector 21 by the guide laser light source 22 functions as guide light to travel in the same direction as a reflected beam changed in direction by the tilted reflector 21.

Guide light is input to the tilted reflector 21 for the following reason. A laser beam from a light source to produce an output of 100 W or more is used as a laser beam for laser machining. A laser beam for laser machining has an oscillation wavelength in an infrared region, so that the laser beam cannot be recognized visually. In this embodiment, from the viewpoint of safety that passage of a laser beam is preferably recognized visually, an infrared reflected beam and guide light of the visible ray 22a are emitted to travel along the same optical axis, thereby allowing passage of the reflected beam to be recognized visually by the presence of the guide light.

The temperature switch 23 is installed on an extension of an optical axis of an input beam input to the case body 10 through the beam entrance 3 and behind the tilted reflector 21. The temperature switch 23 is configured in such a manner that it is determined whether or not the tilted reflector 21 has been burned by turning on or off of the temperature switch 23.

As shown in FIG. 1, each of the two photodiodes 5 is provided to a corresponding one of the two beam exits 4. The photodiode 5 is a sensor that detects scattered light of a reflected beam at the beam exit 4 changed in direction by the tilted reflector 21.

Scattered light of a reflected beam is due to collision of a laser beam, for example, with the output-side optical fiber 102 of the beam exit 4 to be caused if coupling efficiency (a ratio of an output value of a laser beam at the beam exit 4 to an input value of the laser beam at the beam entrance 3) is reduced by angular deviation from a selected one of the beam exits 4 due to attachment error of the rotary drive motor 6, for example. The photodiode 5 senses such scattered light of a reflected beam.

The controller 8 controls a rotational angle about the rotary axis member 62 of the rotary drive motor 6. The controller 8 controls the rotary axis member 62 of the rotary drive motor 6 so as to rotationally move the tilted reflector 21 to a predetermined reflection position by directing the tilted reflector 21 toward a selected one of the beam exits 4 based on angular information about the rotary axis J of the rotary drive motor 6 stored in the storage 9. More specifically, the controller 8 exerts feedback control so as to adjust a rotational angle about the rotary axis member 62 of the rotary drive motor 6 at a target angle by using the rotary drive motor 6 formed of the servo motor and the position detector 7. For example, a value to be used as a target angle intended to be achieved by the feedback control is a value determined during manufacture so as to achieve maximum coupling efficiency (a ratio of an output value of a laser beam at the beam exit 4 to an input value of the laser beam at the beam entrance 3). A target angle intended to be achieved by the feedback control can be changed after shipment.

The controller 8 includes an angular information changing part 81. The angular information changing part 81 changes angular information in the storage 9 so as to minimize a value detected by the photodiode 5 while a reflected beam is output to the beam exit 4. In this way, based on a value about scattered light detected by the photodiode 5, the controller 8 changes a target value intended to be achieved by the feedback control so as to minimize the detected value about the scattered light. This makes it possible to maintain coupling efficiency (a ratio of an output value of a laser beam at the beam exit 4 to an input value of the laser beam at the beam entrance 3), which may be reduced by angular deviation from a selected one of the beam exits 4 due to attachment error of the rotary drive motor 6, for example, to an optimum value The storage 9 stores rotational position about the rotary axis member 62 of the rotary drive motor 6. The storage 9 stores control programs for execution of corresponding operations of the beam distributor 1, predetermined parameters, etc. The storage 9 stores angular information recorded in advance about the rotary axis J of the rotary axis member 62 of the rotary drive motor 6 corresponding to the position of each of the beam exits 4, for example. The angular information about the rotary axis J of the rotary drive motor 6 stored in the storage 9 is changed by the angular information changing part 81 of the controller 8.

The beam distributor 1 according to this embodiment having the above-described configuration achieves the following effect. In the configuration of this embodiment, the beam distributor 1 includes the housing 10 for passage of a laser beam, the at least one beam entrance 3, the two or more beam exits 4, the rotary drive motor 6, and the tilted reflector 21 fixed to the rotary axis member 62 of the rotary drive motor 6 and changing a laser beam in direction input to the inside of the case body 10 through the beam entrance 3 so as to guide the input laser beam to the beam exit 4. The rotary axis J of the rotary drive motor 6 is arranged parallel to an optical axis of the laser beam input through the beam entrance 3 so as to input the laser beam to the tilted reflector 21 at a constant angle independently of a rotational angle about the rotary axis J of the rotary drive motor 6. The beam exit 4 is arranged in a direction to which the laser beam is changed in direction by the tilted reflector 21 in response to rotation of the rotary axis member 62 of the rotary drive motor 6. The storage 9 stores angular information recorded in advance about the rotary axis J of the rotary drive motor 6 corresponding to the position of each of the beam exits 4.

By arranging the rotary axis J of the rotary drive motor 6 parallel to an optical axis of a laser beam input through the beam entrance 3, the reflectivity of the laser beam at the tilted reflector 21 can be maintained at a constant level independently of a rotational angle about the rotary axis member 62 of the rotary drive motor 6. Thus, reduction in the reflectivity of a laser beam can be suppressed to allow reduction in energy loss of the laser beam.

The storage 9 stores angular information recorded in advance about the rotary axis J of the rotary drive motor 6 corresponding to the position of each of the beam exits 4. Thus, even if angular deviation from a selected one of the beam exits 4 is caused due to attachment error of the rotary drive motor 6, for example, coupling efficiency (a ratio of an output value of a laser beam at the beam exit 4 to an input value of the laser beam at the beam entrance 3) can still be maintained at an optimum value.

In the configuration of this embodiment, the photodiode 5 is provided that detects scattered light of a reflected beam at the beam exit 4 changed in direction by the tilted reflector 21. Angular information in the storage 9 is changed so as to minimize a value detected by the photodiode 5 in a state in which the reflected beam is output to the beam exit 4. Thus, even if angular deviation from a selected one of the beam exits 4 is caused due to attachment error of the rotary drive motor 6, for example, coupling efficiency (a ratio of an output value of a laser beam at the beam exit 4 to an input value of the laser beam at the beam entrance 3) can still be maintained at an optimum value based on a value about scattered light detected by the photodiode 5.

In this embodiment, the temperature switch 23 is installed on an extension of an optical axis of an input beam input to the case body 10 through the beam entrance 3 and behind the tilted reflector 21. The temperature switch 23 is configured in such a manner that it is determined whether or not the tilted reflector 21 has been burned by turning on or off of the temperature switch 23. In this way, burning of the tilted reflector 21 can be determined.

In this embodiment, the tilted reflector 21 is configured to have dichroism by which the tilted reflector 21 reflects an input beam and causes the visible ray 22a to pass through. The guide laser light source 22 is arranged in such a manner that the visible ray 22a oscillated by the guide laser light source 22 passes through the tilted reflector 21 to travel along the same optical axis as a reflected beam. In this way, the input beam and guide light of the visible ray 22a are emitted to travel along the same optical axis. Thus, an output beam can be output to the output-side optical fiber 102 while passage of a laser beam is allowed to be recognized visually by the presence of the guide light of the visible ray 22a.

The present invention is not to be limited to the above-described embodiment. Various changes or modifications are also covered by the present invention as long as such changes or modifications fall in a range in which the object of the present invention can be achieved.

For example, in the above-described embodiment, two beam exits 4 are provided. However, this is not the only number of the beam exits 4 but three or more beam exits 4 can be provided.

In the above-described embodiment, one or more optical members for changing an input beam in direction may be provided between the beam entrance 3 and the tilted reflector (beam turning part).

In the above-described embodiment, the scattered light sensor is formed of a photodiode. However, the scattered light sensor is not limited to a photodiode but it can be formed of a member other than a photodiode.

EXPLANATION OF REFERENCE NUMERALS

1 Beam distributor
3 Beam entrance
4 Beam exit
5 Photodiode (scattered light sensor)
6 Rotary drive motor (motor)
7 Position detector (position detection device)
8 Controller
9 Storage
10 Case body (housing)
21 Tilted reflector (beam turning part)
22 Guide laser light source (guide laser)
22a Visible ray
23 Temperature switch
62 Rotary axis member
J Rotary axis

What is claimed is:

1. A beam distributor comprising:
a housing for passage of a beam;
at least one beam entrance;
two or more beam exits;
a motor;
a position detection device that detects a rotational position about a rotary axis member of the motor;
a controller that controls the rotational position about the rotary axis member of the motor;
a storage that stores the rotational position about the rotary axis member of the motor; and
a beam turning part fixed to the rotary axis member of the motor and changing a direction of a beam input to an inside of the housing through the beam entrance so as to guide the beam being input to one of the beam exits, wherein
a rotary axis of the motor is arranged parallel to an optical axis of the beam input through the beam entrance so as to input the beam to the beam turning part at a constant angle independently of a rotational angle about the rotary axis of the motor,
each of the beam exits is arranged in a direction to which the direction of the beam is changed by the beam turning part in response to rotation of the rotary axis member of the motor, and
the storage stores an angular information recorded in advance about the rotary axis of the motor corresponding to a position of each of the multiple beam exits, wherein
the beam distributor includes a scattered light sensor that detects scattered light of a reflected beam at one of the beam exits changed in direction by the beam turning part, wherein the angular information in the storage is changed so as to minimize a value detected by the scattered light sensor while the reflected beam is output to one of the beam exits.

2. A beam distributor comprising:
a housing for passage of a beam;
at least one beam entrance;
two or more beam exits;
a motor;
a position detection device that detects a rotational position about a rotary axis member of the motor;
a controller that controls the rotational position about the rotary axis member of the motor;
a storage that stores the rotational position about the rotary axis member of the motor;
a beam turning part fixed to the rotary axis member of the motor and changing a direction of a beam input to an inside of the housing through the beam entrance so as to guide the beam being input to one of the beam exits; and
a guide laser that oscillates a visible ray, wherein a rotary axis of the motor is arranged parallel to an optical axis of the beam input through the beam entrance so as to input the beam to the beam turning part at a constant angle independently of a rotational angle about the rotary axis of the motor, each of the beam exits is arranged in a direction to which the direction of the beam is changed by the beam turning part in response to rotation of the rotary axis member of the motor, and the storage stores an angular information recorded in advance about the rotary axis of the motor corresponding to a position of each of the multiple beam exits, wherein the beam turning part has dichroism by which the beam turning part reflects an input beam input to the housing through the beam entrance and causes the visible ray to pass through, and the guide laser is arranged in such a manner that the visible ray oscillated by the guide laser passes through the beam turning part to travel in conformity with an optical axis of a reflected beam.

3. The beam distributor according to claim 1, wherein a temperature switch is installed on an extension of an optical axis of an input beam input to the housing through the beam entrance and behind the beam turning part, and the temperature switch is configured in such a manner that it is determined whether or not the beam turning part has been burned by turning on or off of the temperature switch.

\* \* \* \* \*